United States Patent [19]

Mizuno et al.

[11] Patent Number: 4,946,615
[45] Date of Patent: Aug. 7, 1990

[54] METHOD OF PREPARING KNEADED MIXTURE FOR MAGNETIC COATING MATERIAL

[75] Inventors: Chiaki Mizuno; Masatoshi Kiyama; Takao Komi; Hiroshi Ogawa; Shinichi Funabashi, all of Kanagawa, Japan

[73] Assignee: Fuji Photo Film Co., Ltd., Kanagawa, Japan

[21] Appl. No.: 259,655

[22] Filed: Oct. 19, 1988

[30] Foreign Application Priority Data

Oct. 19, 1987 [JP] Japan ............................ 62-264722

[51] Int. Cl.$^5$ ............................................ H01F 1/28
[52] U.S. Cl. .................................................. 252/62.54
[58] Field of Search ...................... 252/62.54; 366/292, 366/297, 279, 315; 425/204, 205; 264/349

[56] References Cited

U.S. PATENT DOCUMENTS

| | | | |
|---|---|---|---|
| 3,728,262 | 4/1973 | Lemmen et al. | 252/62.54 |
| 4,229,312 | 10/1980 | Nagashiro et al. | 252/62.54 |
| 4,634,632 | 1/1987 | Ogawa et al. | 252/62.54 |
| 4,668,568 | 5/1987 | Fujiyama et al. | 252/62.54 |

FOREIGN PATENT DOCUMENTS

| | | |
|---|---|---|
| 48-104505 | 12/1973 | Japan . |
| 49-14537 | 2/1974 | Japan . |
| 53-76012 | 7/1978 | Japan . |
| 6236472 | 2/1982 | Japan . |
| 57-141026 | 9/1982 | Japan . |
| 62-41274 | 2/1987 | Japan . |

OTHER PUBLICATIONS

"Kurimoto Giho", No. 15, Chap. 9, separate volume, (1986,87), Kurimoto, Ltd.

Primary Examiner—Gary P. Straub
Assistant Examiner—Stephen G. Kalinchak
Attorney, Agent, or Firm—Sughrue, Mion, Zinn, Macpeak & Seas

[57] ABSTRACT

A method of preparing a kneaded mixture for a magnetic coating material comprises a kneading start process and a continuous kneading process. In the kneading start process, a low-viscosity composition, which is composed of magnetic layer forming materials containing ferromagnetic grains and a binder, and a solvent, is introduced into a kneading vessel of a two-shaft continuous kneading and mixing machine, and kneading is started. In the continuous kneading process, after the start of the kneading, a high-viscosity composition, in which a solvent amount is smaller by at least 7 wt % than the solvent amount in the low-viscosity composition used in the kneading start process, is continously introduced into the kneading vessel, and the kneading is continued while high shearing force is being given to the high-viscosity composition.

7 Claims, 2 Drawing Sheets

METHOD OF PREPARING KNEADED MIXTURE FOR MAGNETIC COATING MATERIAL

BACKGROUND OF THE INVENTION

1. Field of the Invention

This invention relates to a method of preparing a magnetic coating material. This invention particularly relates to a method of preparing a kneaded mixture for a magnetic coating material by use of a two-shaft continuous kneading and mixing machine.

2. Description of the Prior Art

In the production of a magnetic recording medium, in order to quickly obtain a magnetic coating material having a high dispersing quality, there has heretofore been known to carry out a series of processes for kneading ferromagnetic grains and a small amount of a binder solution by use of an incorporating machine such as a kneader exhibiting high shearing force before the ferromagnetic grains are dispersed in the binder solution by use of a dispersing machine such as a ball mill or a sand grinder. Also, in order to obtain a uniform paste by the kneading, it has heretofore been known to increase the kneading effect by use of a dispersant and/or a stabilizer or by use of a binder within a specified range of concentration. The techniques with respect to these preparation methods are disclosed in, for example, Japanese Unexamined Patent Publication Nos. 46(1971)-3030, 48(1973)-104505, 49(1974)-14537, 53(1978)-76012, 55(1980)-25406, and 57(1982)-141026.

Techniques for kneading by use of a continuous kneading and mixing machine in the kneading process are described in, for example, "Kurimoto Giho", No. 15, Chapter 9, separate volume, (1986, 7), Kurimoto, Ltd., and Japanese Unexamined Patent Publication Nos. 62(1987)-36472 and 62(1987)-41274. However, nothing has heretofore been proposed concerning a method of kneading reliably with very high shearing force.

On the other hand, as one of the methods for kneading with shearing force higher than in the conventional techniques, it has heretofore been known to carry out the kneading by minimizing the amount of a solvent in the kneaded mixture. Specifically, with the known method, in order to exert high shearing force, it is necessary for the kneading to be carried out at as high a viscosity as possible. However, in the case where the kneading is carried out by use of the minimum amount of the solvent, the kneading may become impossible and cannot be carried out reliably depending on fluctuations in external factors such as the temperature and humidity, and fluctuations in raw materials, particularly fluctuations in physical properties, for example, the water content, bulk density and specific surface area of the ferromagnetic grains.

The same problems arise in the case where the kneading is carried out by use of the two-shaft continuous kneading and mixing machine. Specifically, at the time the kneading is to be started by use of the two-shaft continuous kneading and mixing machine, the kneading vessel has not been loaded with a composition for the magnetic coating material to be kneaded, and thus is empty. In the case where a high-viscosity composition for the magnetic coating material is introduced into the kneading vessel in this condition, no back pressure is given rise to in the two-shaft continuous kneading and mixing machine, and idling readily arises. Also, the kneading may become impossible and cannot be carried out reliably depending on fluctuations in the external factors and fluctuations in raw materials.

SUMMARY OF THE INVENTION

The primary object of the present invention is to provide a novel method of preparing a kneaded mixture for a magnetic coating material wherein kneading is carried out continuously and reliably by use of a two-shaft continuous kneading and mixing machine.

Another object of the present invention is to provide a method of preparing a kneaded mixture for a magnetic coating material, which is suitable for production of a magnetic recording medium exhibiting high magnetic characteristics.

The present invention provides a method of preparing a kneaded mixture for a magnetic coating material, the method comprising:

(i) a kneading start process for introducing a low-viscosity magnetic coating material composition, which is composed of magnetic layer forming materials for a magnetic recording medium containing ferromagnetic grains and a binder, and a solvent, into a kneading vessel of a two-shaft continuous kneading and mixing machine, and starting kneading, and (ii) a continuous kneading process for, after the start of the kneading, continuously introducing a high-viscosity magnetic coating material composition, in which a solvent amount is smaller by at least 7 wt% than the solvent amount in said low-viscosity magnetic coating material composition used in said kneading start process, into said kneading vessel, and continuing the kneading, whereby a back pressure from said low-viscosity magnetic coating material composition introduced previously is given to said high-viscosity magnetic coating material composition, thereby to continuously knead while high shearing force is being given to said high-viscosity magnetic coating material composition.

The low viscosity of the low-viscosity magnetic coating material composition and the high viscosity of the high-viscosity magnetic coating material composition are of values relative to each other, and are not limited to specific ranges.

With the method of preparing a kneaded mixture for a magnetic coating material in accordance with the present invention wherein the two-shaft continuous kneading and mixing machine is utilized, the kneading can be carried out continuously and reliably with high shearing force without being adversely affected by fluctuations in external factors such as the temperature and humidity, and fluctuations in raw materials, particularly fluctuations in physical properties, for example, the water content, bulk density and specific surface area of the ferromagnetic grains.

Also, the kneaded material prepared by the method of preparing a kneaded mixture for a magnetic coating material has a high dispersing quality of the ferromagnetic grains and other constituents. Therefore, a magnetic recording medium obtained by preparing a magnetic coating material by use of the kneaded mixture prepared by the method in accordance with the present invention and applying the magnetic coating material onto a substrate exhibits high surface gloss and excellent magnetic characteristics, i.e. a high maximum magnetic flux density (Bm) and a high residual magnetic flux density (Br).

DETAILED DESCRIPTION OF THE INVENTION

Basically, the method of preparing a kneaded mixture for a magnetic coating material in accordance with the present invention comprises the kneading start process and the continuous kneading process. In the kneading start process, the magnetic coating material composition (mixture) composed of magnetic layer forming materials for a magnetic recording medium containing ferromagnetic grains, a binder, and optionally an abrasive material, carbon black and other constituents, and a solvent is introduced into the kneading vessel of the two-shaft continuous kneading and mixing machine, and the kneading is started. In the subsequent continuous kneading process, the magnetic coating material composition having viscosity higher than the viscosity of the magnetic coating material composition used in the kneading start process is continuously introduced into the kneading vessel, and the kneading is continued, thereby to continuously knead while high shearing force is being given to the high-viscosity magnetic coating material composition. The amount of the solvent in the magnetic coating material composition used in the continuous kneading process must be smaller than the amount of the solvent in the magnetic coating material composition used in the kneading start process.

As mentioned above, the magnetic coating material composition used in the continuous kneading process has high viscosity so that it exerts a to high shearing force. In the case where the high-viscosity magnetic coating material composition is used in the kneading start process, no back pressure is given to the high-viscosity magnetic coating material composition, idling arises, and the kneading cannot often be achieved. Therefore, in this case, the kneading cannot be carried out reliably.

Figure 1:
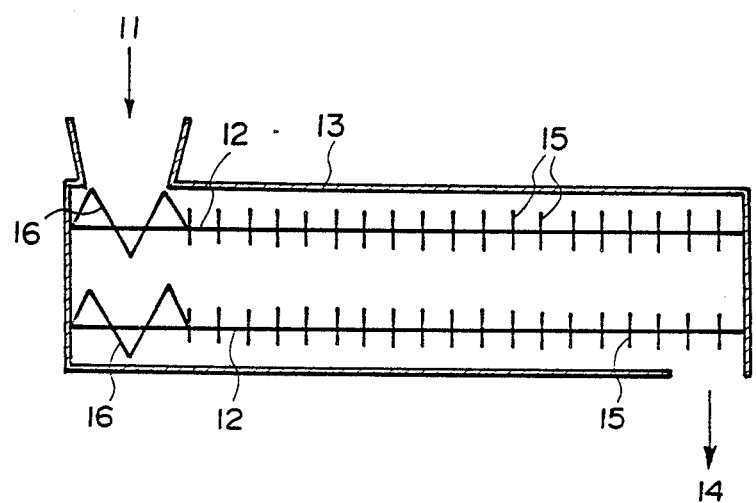
FIG. 1 is a schematic view showing the kneading vessel of the two-shaft continuous kneading and mixing machine for kneading the magnetic coating material composition.

Specifically, prior to the kneading start process, the kneading vessel has not been loaded with the composition for the magnetic coating material to be kneaded, and thus is empty. FIG. 1 shows the configuration of the kneading vessel. The kneading vessel comprises a barrel 13, stirring shafts 12, 12 supported in parallel for rotation in the barrel 13, paddles 15, 15, ... and a screw 16 secured to one of the stirring shafts 12, 12, and paddles 15, 15, ... and a screw 16 secured to the other of the stirring shafts 12, 12. The stirring shafts 12, 12 are rotated in the same directions at equal speeds. In the case where the magnetic coating material composition having high viscosity is introduced into the kneading vessel in the empty condition, no back pressure is given rise to and the kneading cannot be carried out reliably in the barrel 13 of the kneading vessel when the viscosity to too high depending on fluctuations in the external factors such as the temperature and humidity, and fluctuations in raw materials, particularly fluctuations in physical properties, for example, the water content, bulk density and specific surface area of the ferromagnetic grains.

Also, in the case where the magnetic coating material composition having low viscosity is continuously introduced into the kneading vessel to facilitate the kneading, the shearing force cannot be obtained substantially, and a kneaded mixture having a high dispersing quality cannot be obtained.

With the method of preparing a kneaded mixture for a magnetic coating material wherein the aforesaid magnetic coating material composition is kneaded by use of the two-shaft continuous kneading and mixing machine, the viscosity of the magnetic coating material composition used in the kneading start process for introducing the magnetic coating material composition into the kneading vessel of the two-shaft continuous kneading and mixing machine and starting the kneading is adjusted to be lower than the viscosity of the magnetic coating material composition used in the continuous kneading process so that the kneading is carried out continuously and reliably. The amount of the solvent in the magnetic coating material composition used in the kneading start process should preferably be within the range of not smaller than 10 wt% with respect to the amount of the ferromagnetic grains, more preferably within the range of not smaller than 15 wt% with respect to the amount of the ferromagnetic grains.

Also, the continuous kneading process should preferably be carried out after the kneading vessel is filled with the magnetic coating material composition used in the kneading start process. Moreover, the continuous kneading process should preferably be begun after the low-viscosity magnetic coating material composition has been continuously introduced and kneaded in the kneading vessel in a time within the range of 0.5 to 30 minutes in the kneading start process.

On the other hand, the amount of the solvent in the high-viscosity magnetic coating material composition used in the continuous kneading process should be smaller by at least 7 wt% than the solvent amount in the magnetic coating material composition used in the kneading start process, preferably by at least 14 wt% than the solvent amount in the magnetic coating material composition used in the kneading start process.

In the method of preparing a kneaded mixture for a magnetic coating material in accordance with the present invention, the magnetic layer forming materials such as the binder and the ferromagnetic grains, and the solvent as mentioned below may be used.

A known thermoplastic resin, a known thermosetting resin, a known reactive resin, or a combination of two or more of these resins may be used as the binder. Specifically, the binder may be a vinyl chloride copolymer, for example, a vinyl chloride-vinyl acetate copolymer, a vinyl chloride-vinyl acetate-vinyl alcohol copolymer, a vinyl chloride-vinyl acetate-acrylic acid copolymer, a vinyl chloride-vinylidene chloride copolymer, a vinyl chloride-acrylonitrile copolymer, an ethylene-vinyl acetate copolymer, or a vinyl chloride copolymer incorporated with a polar group such as a $-SO_3N$ group or a $-So_2Na$ group, and an epoxy group; a cellulose derivative such as a nitrocellulose resin; an acrylic resin; a polyvinyl acetal resin; a polyvinyl butyral resin; an epoxy resin; a phenoxy resin; a polyurethane resin, for example, a polyester polyurethane resin, a polyurethane resin incorporated with a polar group such as a $-So_3Na$ group or a $-So_2Na$ group, or a polycarbonate polyurethane resin.

In the case where a curing agent is used, a polyisocyanate compound is generally used as the curing agent. The polyisocyanate compound is selected from those ordinarily used as a curing agent constituent for polyurethane resins or the like.

Also, in the case where curing processing is carried out by irradiation of an electron beam, a compound having a reactive double bond, for example, urethane acrylate can be used.

The amount of the binder used should preferably be within the range of 5 to 35 parts by weight per 100 parts by weight of the ferromagnetic grains.

Ferromagnetic grains ordinarily used for the magnetic recording medium can be used as the ferromagnetic grains for the method of preparing a magnetic coating composition in accordance with the present invention.

By way of example, metal oxide ferromagnetic grains such as $\gamma$—$Fe_2O_3$, metal oxide ferromagnetic grains containing a different constituent such as cobalt-containing $\gamma$—$Fe_2O_3$, or ferromagnetic metal grains containing iron, cobalt or nickel may be used as the ferromagnetic grains.

The method of preparing a kneaded mixture for a magnetic coating material in accordance with the present invention should preferably be utilized for the preparation of a magnetic coating material using ferromagnetic grains having a specific surface area (in accordance with the BET method) of 25 $m^2/g$ or more.

An abrasive material such as $\alpha$—$Al_2O_3$ (hard inorganic grains) and a solid constituent, for example, a granular antistatic agent such as carbon black may be used as well as the aforesaid binder and the ferromagnetic grains.

The amount of the abrasive material added is generally not larger than 10 parts by weight per 100 parts by weight of the ferromagnetic grains. In general, the mean grain diameter of the abrasive material should be within the range of 0.1 $\mu$m to 1 $\mu$m.

Agents which are ordinarily used for the preparation of magnetic coating compositions such as a lubricant, an antistatic agent, a filler and a dispersant may be used as well as the aforesaid solid constituents.

The solvent used in the present invention may be selected from the solvents which are ordinarily used for the preparation of magnetic coating compositions.

By way of example, the solvent may be a ketone such as methyl ethyl ketone, cyclohexanone, diethyl ketone, methyl isobutyl ketone or acetone; an ether such as diethyl ether, methyl ethyl ether or dioxane; an ester such as ethyl acetate or butyl acetate; an aromatic solvent such as toluene or xylene; or an alcohol such as methanol, ethanol, propanol or butanol. These solvents may be used alone or in combination.

By way of example, a KRC kneader supplied by Kurimoto, Ltd. may be used as the two-shaft continuous kneading and mixing machine. As the KRC kneader, a S-type KRC kneader, a T-type KRC kneader (high-torque type), and a KRC-E kneader are available, among which the T-type KRC kneader is preferably used because of high shearing force. The T-type KRC kneader includes various type numbers different in the paddle diameter and power, for example, T2, T4, T5, T6, T8, T10, T12, T15 and T18.

The paddles are classified into a flat paddle (F) having the function of the kneading, a helical paddle (H) having the functions of the kneading and feeding, and a reverse helical paddle (RH). Each of these three types of the paddles is further classified into the type wherein the angle of the keyway is different by 45° and the type wherein the angle of the keyway is different by 30°.

Figure 2:
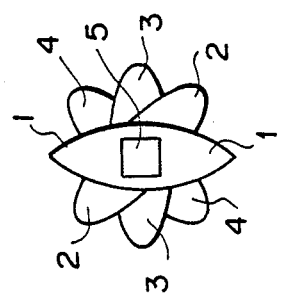
FIG. 2 is a schematic view showing the paddle pattern.

FIG. 2 is a sectional view of a stirring shaft 5 provided with paddles 1, 2, 3 and 4 and shows an example of the paddle pattern. In FIG. 2, the paddles 1, 2, 3 and 4 have the keyways the angles of which differ by 45° from each other.

Figure 3:
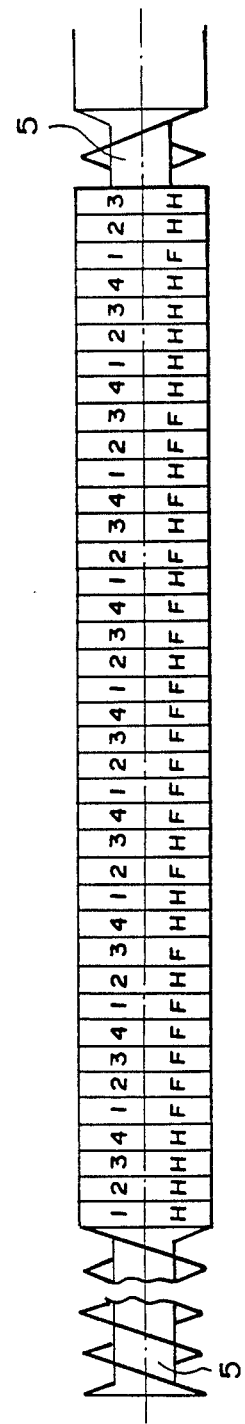
FIG. 3 is a schematic side view showing the stirring shaft provided with paddles.

FIG. 3 is a side view showing an example of the stirring shaft 5 provided with the aforesaid paddles. With reference to FIG. 3, numerals 1, 2, 3 and 4 at the upper part of the stirring shaft 5 denotes the paddles having the keyways the angles of which different by 45° from each other as shown in FIG. 2, and F and H at the lower part of the stirring shaft denote the flat paddle and the helical paddle respectively. In this example, the flat paddles F, F, ... having large kneading effects are continuously provided at the middle of the stirring shaft 5, thereby to enhance the kneading Also, the helical paddles H, H, ... having large conveying effects are provided mainly at both edge portions of the stirring shaft 5, i.e. at the portions adjacent the inlet and outlet of the kneading vessel, so that the magnetic coating material composition smoothly flows into and out of the kneading vessel.

The kneading vessel of the two-shaft continuous kneading and mixing machine having the two stirring shafts provided with the aforesaid paddles has the configuration as shown in FIG. 1.

By way of example, the kneading operations for the mixture of the materials for the formation of the magnetic coating material using the two-shaft continuous kneading and mixing machine (T-type KRC kneader supplied by Kurimoto, Ltd.) are carried out as described below with reference to FIG. 1.

In FIG. 1, reference numeral 11 denotes an inlet for the magnetic coating material composition for the preparation of the kneaded mixture for the magnetic coating material in accordance with the present invention. In general, the binder, the ferromagnetic grains, the solvent and other constituents are independently introduced into the inlet 11 at adjusted feed rates. Therefore, the viscosity of the magnetic coating material composition can be adjusted by the adjustment of the amount of the solvent or the like.

The kneading vessel comprises a barrel 13, stirring shafts 12, 12 supported in parallel for rotation in the barrel 13, paddles 15, 15, ... and a screw 16 secured to one of the stirring shafts 12, 12, and paddles 15, 15, ... and a screw 16 secured to the other of the stirring shafts 12, 12. The stirring shafts 12, 12 are rotated in the same directions at equal speeds. The paddles 15, 15, ... and the screws 16, 16 can be combined with each other as desired in the barrel 13. The screws 16, 16 mainly feed the mixture, and the kneading is effected by the pairs of the paddles 15, 15, ... or the screws 16, 16.

The magnetic coating material composition thus introduced into the inlet 11 is fed by the screws 16, 16 provided exactly below the inlet 11. The kneading and the feeding are effected by the pairs of the paddles 15, 15, ... or the screws 16, 16 provided in the barrel 13, and the kneaded mixture for the preparation of the magnetic coating material is obtained from an outlet 14.

By way of example, preparation of the magnetic coating material by use of the kneaded mixture for the magnetic coating material obtained in the manner as mentioned above is carried out as described below.

Magnetic layer forming materials (mainly a binder) and a solvent are added to the aforesaid kneaded mixture for the magnetic coating material, and the kneaded mixture for the magnetic coating material is thus diluted by use of the aforesaid two-shaft continuous kneading and mixing machine. Abrasive material, a solvent, a lubricant and the like are added to the kneaded mixture for the magnetic coating material thus diluted. The mixture thus obtained is subjected to mixing and dispersion processing several times by use of a mixing apparatus or a kneading apparatus, thereby to obtain the magnetic coating material.

A kneader, a Banbury mixer, a high-speed impeller dispersion machine, a dissolver and a sand grinder may be used as the mixing apparatus and the kneading apparatus.

An antistatic agent, a dispersant and the like may be contained in the magnetic coating material as well as the aforesaid constituents.

The magnetic coating material prepared in the manner as mentioned above is applied onto a substrate, and subjected to processing ordinarily carried out for the magnetic recording medium such as magnetic-field orientation processing, drying processing and surface smoothing processing, thereby to form a magnetic layer.

The present invention will further be illustrated by the following nonlimitative examples. In the examples, the term "parts" means parts by weight unless otherwise specified.

EXAMPLE 1

| Binder solution (S) | |
|---|---|
| Hydroxyl group-containing vinyl chloride-Vinyl acetate copolymer (Denka Vinyl 1000G, Denki Kagaku Kogyo K. K.) | 20 parts |
| Methyl ethyl ketone | 40 parts |
| Butyl acetate | 40 parts |

A binder solution (S) (resin concentration 20 wt%) having the composition shown above was prepared. Kneading was carried out with the composition shown below by use of the binder solution (S).

KNEADING COMPOSITION

| | |
|---|---|
| Co—FeO$_x$ | 100 parts |
| (x = 1.45, coercive force: 730 Oe, mean length of longer axis: 0.2 μm, specific surface area: 35.0 m$^2$/g, tap density: 0.77 g/ml, water content: 0.5%) | |
| Binder solution (S) | 30 parts |
| Hydroxyl group-containing vinyl chloride-vinyl acetate copolymer (Denka Vinyl 1000G, Denki Kagaku Kogyo K. K.) | 10 parts |
| Carbon black | 1 part |
| Methyl ethyl ketone | 2.5 parts |
| Butyl acetate | 2.5 parts |

Ferromagnetic grains Co—FeO$_x$, the binder solution (S), the hydroxyl group-containing vinyl chloride - vinyl acetate copolymer, carbon black and the solvents (methyl ethyl ketone and butyl acetate) in the ratios shown above were continuously introduced from independent tanks into an inlet of a two-shaft continuous kneading and mixing machine (KRC Kneader T-4, Kurimoto, Ltd.), and kneaded. While kneading, a kneading vessel of the two-shaft continuous kneading and mixing machine was filled with the above kneading composition containing the solvents in a ratio of 29 wt% with respect to the ferromagnetic grains within 10 minutes (kneading start process) Thereafter, introduction of the solvents (methyl ethyl ketone and butyl acetate) was stopped, and introduction of the other constituents of the kneading composition listed above in this Example 1 was continued. In this manner, a mixture of the composition constituents listed above and containing the solvents in an amount smaller by 17 wt% than the solvent amount used in the kneading start process, i.e. a mixture containing the solvent in a of the kneading composition constituents listed above and a ratio of 24 wt% with respect to the ferromagnetic grains, was kneaded continuously (continuous kneading process).

At this time, the kneading condition was investigated. Table 1 shows the results of the investigation.

Thereafter, 141 parts of the kneaded mixture obtained by the aforesaid continuous kneading process and the constituents listed below were mixed together by a two-shaft continuous kneading and mixing machine, thereby to dilute the kneaded mixture.

| | |
|---|---|
| Polyurethane resin (Crisvon 7209, concentration 45%, Dainippon Ink and Chemicals, Inc.) | 8.9 parts |
| Methyl ethyl ketone | 30 parts |
| Butyl acetate | 30.1 parts |

Then, 210 parts of the diluted mixture thus obtained and the constituents listed below were subjected to mixing and dispersion in a dissolver.

| | |
|---|---|
| Myristic acid | 2.0 parts |
| Oleic acid | 0.5 part |
| Dimethyl polysiloxane | 0.2 part |
| α-Al$_2$O$_3$ | 1.0 part |
| Methyl ethyl ketone | 58 parts |
| Butyl acetate | 58 parts |

The mixture was then subjected to dispersion in a sand grinder to obtain a magnetic coating material. The magnetic coating material was applied onto a polyester substrate and subjected to orientation processing and drying to form a magnetic layer. In this manner, a magnetic tape web was obtained.

EXAMPLE 2

A magnetic tape web was made by carrying out kneading processing in the same manner as in Example 1 except that ferromagnetic grains having tap density of 0.92 g/ml and a water content of 0.6% were used instead of the ferromagnetic grains having tap density of 0.77 g/ml and a water content of 0.5%.

EXAMPLE 3

A magnetic tape web was made by carrying out kneading processing in the same manner as in Example 1 except that ferromagnetic grains having tap density of 0.92 g/ml and a water content of 1.1% were used instead of the ferromagnetic grains having tap density of 0.77 g/ml and a water content of 0.5%.

EXAMPLE 4

| | |
|---|---|
| Co—FeO$_x$ | 100 parts |

-continued (x = 1.45, coercive force: 730 Oe,
mean length of longer axis: 0.2 μm,
specific surface area: 35.0 m²/g,
tap density: 0.77 g/ml,
water content: 0.5%)
| | |
|---|---|
| Binder solution (S) | 31.3 parts |
| Hydroxyl group-containing vinyl chloride-vinyl acetate copolymer (Denka Vinyl 1000G, Denki Kagaku Kogyo K. K.) | 9.7 parts |
| Carbon black | 1 part |
| Methyl ethyl ketone | 1 part |
| Butyl acetate | 1 part |

Ferromagnetic grains Co—FeO$_x$, the binder solution (S), the hydroxyl group-containing vinyl chloride - vinyl acetate copolymer, carbon black and the solvents (methyl ethyl ketone and butyl acetate) in the ratios shown above were continuously introduced from independent tanks into an inlet of a two-shaft continuous kneading and mixing machine (KRC Kneader T-4, Kurimoto, Ltd.), and kneaded. While kneading, a kneading vessel of the two-shaft continuous kneading and mixing machine was filled with the mixture containing the solvents in a ratio of 27 wt% with respect to the ferromagnetic grains within 10 minutes (kneading start process). Thereafter, introduction of the solvents (methyl ethyl ketone and butyl acetate) was stopped, and introduction of the other constituents was continued. In this manner, a mixture containing the solvents in an amount smaller by 7.4 wt% than the solvent amount used in the kneading start process, i.e. the mixture containing the solvent in a ratio of 25 wt% with respect to the ferromagnetic grains, was kneaded continuously (continuous kneading process).

At this time, the kneading condition was investigated. The results of the investigation are shown in Table 1.

Thereafter, a magnetic coating material was prepared from 142 parts of the kneaded mixture obtained by the aforesaid continuous kneading process by using the same composition and the same preparation method as in Example 1.

The magnetic coating material was applied onto a polyester substrate and subjected to orientation processing and drying to form a magnetic layer. In this manner, a magnetic tape web was obtained.

EXAMPLE 5

A magnetic tape web was made by carrying out kneading processing in the same manner as in Example 4 except that ferromagnetic grains having tap density of 0.92 g/ml and a water content of 0.6% were used instead of the ferromagnetic grains having tap density of 0.77 g/ml and a water content of 0.5%.

COMPARATIVE EXAMPLE 1

A magnetic tape web was made by carrying out kneading processing in the same manner as in Example 1 except that the kneading composition containing the solvents in the same ratio as in the continuous kneading process (i.e. in the ratio of 24 wt% with respect to the ferromagnetic grains) was used from the beginning of the kneading in the two-shaft continuous kneading and mixing machine, and the kneading was carried out continuously.

KNEADING COMPOSITION

| | |
|---|---|
| Co—FeO$_x$ | 100 parts |
| (x = 1.45, coercive force: 730 Oe, mean length of longer axis: 0.2 μm, specific surface area: 35.0 m²/g, tap density: 0.77 g/ml, water content: 0.5%) | |
| Binder solution (S) | 30 parts |
| Hydroxyl group-containing vinyl chloride-vinyl acetate copolymer (Denka Vinyl 1000G, Denki Kagaku Kogyo K. K.) | 10 parts |
| Carbon black | 1 part |

COMPARATIVE EXAMPLE 2

A magnetic tape web was made by carrying out kneading processing in the same manner as in Comparative Example 1 except that ferromagnetic grains having tap density of 0.92 g/ml and a water content of 0.6% were used instead of the ferromagnetic grains having tap density of 0.77 g/ml and a water content of 0.5%.

COMPARATIVE EXAMPLE 3

A magnetic tape web was made by carrying out kneading processing in the same manner as in Comparative Example 1 except that ferromagnetic grains having tap density of 0.92 g/ml and a water content of 1.1% were used instead of the ferromagnetic grains having tap density of 0.77 g/ml and a water content of 0.5%.

COMPARATIVE EXAMPLE 4

Kneading was carried out continuously in the same manner as in Example 1 except that the kneading composition containing the solvents in the same ratio as in the continuous kneading process (i.e. in the ratio of 27 wt% with respect to the ferromagnetic grains) was used from the beginning of the kneading in the two-shaft continuous kneading and mixing machine.

KNEADING COMPOSITION

| | |
|---|---|
| Co—FeO$_x$ | 100 parts |
| (x = 1.45, coercive force: 730 Oe, mean length of longer axis: 0.2 μm, specific surface area: 35.0 m²/g, tap density: 0.77 g/ml, water content: 0.5%) | |
| Binder solution (S) | 33.7 parts |
| Hydroxyl group-containing vinyl chloride-vinyl acetate copolymer (Denka Vinyl 1000G, Denki Kagaku Kogyo K. K.) | 9.3 parts |
| Carbon black | 1 part |

Preparation of a magnetic coating material from the kneaded mixture obtained by continuous kneading processing was carried out in the same manner as in Example 1 except that the amounts of the solvents in Example 1 were changed as shown below.

Specifically, 144 parts of the kneaded mixture obtained by the aforesaid continuous kneading processing and the constituents listed below were mixed together by a two-shaft continuous kneading and mixing machine, thereby to dilute the kneaded mixture.

| | |
|---|---|
| Polyurethane resin (Crisvon 7209, concentration 45%, Dainippon Ink and Chemicals, Inc.) | 8.9 parts |
| Methyl ethyl ketone | 28.5 parts |

-continued

| Butyl acetate | 28.6 parts |

Then, 210 parts of the diluted mixture thus obtained and the constituents listed below were subjected to mixing and dispersion in a dissolver.

| Myristic acid | 2.0 parts |
| Oleic acid | 0.5 part |
| Dimethyl polysiloxane | 0.2 part |
| α-Al$_2$O$_3$ | 1.0 part |
| Methyl ethyl ketone | 58 parts |
| Butyl acetate | 58 parts |

The mixture was then subjected to dispersion in a sand grinder to obtain a magnetic coating material.

Thereafter, a magnetic tape web was made in the same manner as in Example 1.

COMPARATIVE EXAMPLE 5

A magnetic tape web was made by carrying out kneading processing in the same manner as in Comparative Example 4 except that ferromagnetic grains having tap density of 0.92 g/ml and a water content of 1.1% were used instead of the ferromagnetic grains having tap density of 0.77 g/ml and a water content of 0.5%.

The measurement results of the kneading conditions of the kneaded mixtures obtained in the aforesaid Examples and the Comparative Examples, and B-H characteristics and gloss of the ultimately obtained magnetic tape webs are shown in Table 1.

The measurement conditions were as described below.

Kneading condition

The kneading condition was judged by observing the kneaded mixture in the two-shaft continuous kneading and mixing machine.

AA: Indicates that the kneading is possible, and the kneaded mixture is in the viscous paste form.

BB: Indicates that the kneading was impossible, and the mixture was in the powder form.

Bm (maximum magnetic flux density)

The Bm value at Hm 5 k Oe was measured by use of a vibrating sample magnetic flux meter (Toei Kogyo K. K.). Br (residual magnetic flux density)

The Br value at Hm 5 k Oe was measured by use of a vibrating sample magnetic flux meter (Toei Kogyo K.K.). SQ (squareness ratio)

The Br/Bm value at Hm 5 k Oe was measured by use of a vibrating sample magnetic flux meter (Toei Kogyo K. K.). Hc (coercive force)

The Hc value at Hm 5 k Oe was measured by use of a vibrating sample magnetic flux meter (Toei Kogyo K. K.). Surface gloss (%)

The surface gloss was measured at an angle of incidence of 60° in accordance with JIS-Z-8741. The values of the surface gloss shown in Table 1 are the values with respect to the specular gloss of a surface of a gloss having a refractive index of 1.567, which is taken as 100%.

TABLE 1

| | Knead condi-tion | Magnetic tape characteristics | | | | |
| --- | --- | --- | --- | --- | --- | --- |
| | | Bm(G) | Br(G) | SQ | Hc(Oe) | Surface gloss (%) |
| Example | | | | | | |
| 1 | AA | 2240 | 1910 | 0.85 | 648 | 121 |
| 2 | AA | 2270 | 1930 | 0.85 | 643 | 124 |
| 3 | AA | 2250 | 1900 | 0.84 | 640 | 120 |
| 4 | AA | 2200 | 1890 | 0.86 | 650 | 118 |
| 5 | AA | 2220 | 1890 | 0.85 | 644 | 116 |
| Comp. Ex. | | | | | | |
| 1 | BB | — | — | — | — | — |
| 2 | AA | 2260 | 1930 | 0.84 | 642 | 123 |
| 3 | BB | — | — | — | — | — |
| 4 | AA | 2150 | 1810 | 0.85 | 642 | 112 |
| 5 | AA | 2140 | 1790 | 0.84 | 639 | 108 |

As is clear from Table 1, in the case where the kneading in the kneading start process was carried out by adjusting the mixture so that it contained the solvents in a ratio of 29 wt% with respect to the ferromagnetic grains, and the kneading in the continuous kneading process was carried out by adjusting the mixture so that it contained the solvents in a ratio of 24 wt% with respect to the ferromagnetic grains as in Examples 1, 2 and 3, adverse effects of fluctuations in the water content of the ferromagnetic grains and fluctuations of the tap density did not arise, and the kneaded mixture was obtained reliably. Also, the magnetic recording media made by use of the kneaded mixtures obtained in Examples 1, 2and 3 exhibited excellent magnetic characteristics, i.e. high Bm and high Br, and the high surface gloss of the magnetic recording media revealed that the dispersing quality was high.

In Examples 4 and 5, the extent of decrease in the amounts of the solvents was reduced as compared with Examples 1, 2 and 3. Specifically, in Examples 4 and 5, the kneading in the kneading start process was carried out by adjusting the mixture so that it contained the solvents in a ratio of 27 wt% with respect to the ferromagnetic grains, and the kneading in the continuous kneading process was carried out by adjusting the mixture so that it contained the solvents in a ratio of 25 wt% with respect to the ferromagnetic grains. Also, in this case, good kneading conditions and excellent magnetic tape characteristics were obtained.

On the other hand, in the case where the kneading was carried out by adjusting the mixture from the beginning so that it contained the solvents in a ratio of 24 wt% with respect to the ferromagnetic grains (in the same ratio as in the continuous kneading process in Examples 1, 2 and 3), the kneading became impossible when the water content of the ferromagnetic grains was high (Comparative Example 1) or when the tap density was low (Comparative Example 3). In Comparative Examples 4 and 5, in order to eliminate such problems, the solvent amounts were increased. Specifically, the kneading was carried out by adjusting the mixture so that it contained the solvents in a ratio of 27 wt% with respect to the ferromagnetic grains. In this case, though the kneading was possible, the electromagnetic transducing characteristics deteriorated.

We claim:

1. A method of preparing a kneaded mixture for a magnetic coating material, the method comprising the steps of:
   (i) introducing a first magnetic coating material composition at a first viscosity and which is composed of magnetic layer forming materials for a magnetic recording medium containing ferromagnetic grains and a binder, and a solvent, into a substantially empty kneading vessel of a two-shaft continuous kneading and mixture machine, and begin kneading said first magnetic coating material composition at a first viscosity, and (ii) after kneading of said first composition of a first viscosity has begun, continuously introducing a second magnetic coating material composition at a second viscosity which is higher than said first viscosity by including in said second composition a solvent in an amount, at least 7 wt% less than the solvent amount in said first magnetic coating material composition used when the kneading process begins, into said kneading vessel, and continuing the kneading, whereby a back pressure from said first magnetic coating material composition introduced previously is given to said second magnetic coating material composition, thereby to continuously knead with a high shearing force provided to said second magnetic coating material composition.

2. A method as defined in claim 1 wherein the solvent amount of said second magnetic coating material composition used in said continuous kneading step is less by at least 14 wt% than the solvent amount in said first magnetic coating material composition used when the kneading begins.

3. A method as defined in claim 1 wherein the solvent amount in said first magnetic coating material composition used when the kneading begins is not smaller than 10 wt% with respect to the ferromagnetic grains.

4. A method as defined in claim 1 wherein said first magnetic coating material composition used when the kneading begins is continuously introduced into said kneading vessel and kneaded for a time within the range of 0.5 to 30 minutes.

5. A method as defined in claim 1 wherein the solvent amount in said first magnetic coating material composition used when the kneading begins is not smaller than 15 wt% with respect to the ferromagnetic grains.

6. A method as defined in claim 1 wherein said ferromagnetic grains have a specific surface area of not less than 25 $m^2/g$ as measured by the BET method.

7. A method as defined in claim 1 wherein an amount of said binder contained in said first and second compositions is within the range of 5 to 35 wt% with respect to the ferromagnetic grains.

* * * * *